March 6, 1928.

J. C. CROMWELL

GASKET

Filed Jan. 12. 1923

1,661,878

INVENTOR
John C. Cromwell,

Patented Mar. 6, 1928.

1,661,878

UNITED STATES PATENT OFFICE.

JOHN C. CROMWELL, OF COLUMBUS, OHIO, ASSIGNOR, BY MESNE ASSIGNMENTS, TO THE TESTITE COMPANY, A CORPORATION.

GASKET.

Application filed January 12, 1923. Serial No. 612,258.

The present invention relates broadly to packing, and method of making the same, and more particularly to gaskets adapted for use in drainage connections of the type required between closet bowls and soil pipes.

It is essential that joints between the outlet horns of closet bowls and soil pipes be tight enough to form an efficient seal. This form of packing should also be such that it is compressible to compensate for irregularities in the assembled parts or for changes in their relative angular relationship. It is also desirable that the packing be of such construction that it will compress substantially uniformly throughout its entire range to thereby insure uniform sealing irrespective of the actual compression, within such range, to which it is subjected. This invention provides a comparatively inexpensive gasket admirably suited to this purpose and possesses to a high degree the desired characteristics.

In the accompanying drawings there is shown, for purpose of illustration only, a specific embodiment of the present invention, the actual scope of the invention being defined in the claims.

Figure 1:
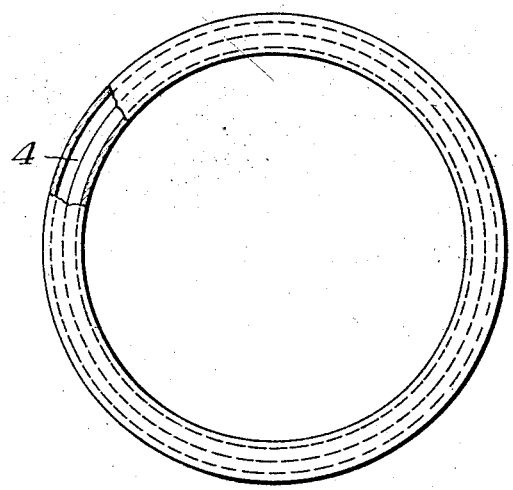
Figure 1 is a top plan view, partly broken away, illustrating a gasket constructed in accordance with this invention.
Figure 2:
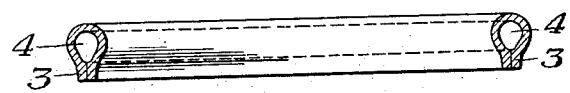
Figure 2 is a transverse sectional view through the gasket illustrated in Figure 1.
Figure 3:
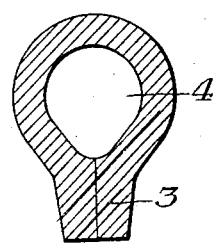
Figure 3 is a transverse sectional view, on an enlarged scale, through one portion of the gasket.
Figure 4:
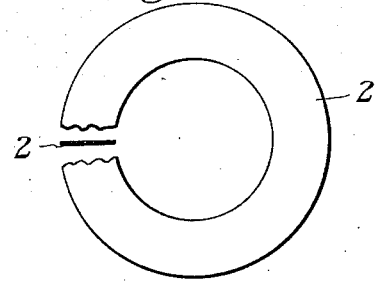
Figure 4 is a view illustrating one form of blank from which the gasket may be formed.

In carrying out the present invention there may be produced in any desired manner a blank 2 in the shape of a flat ring having the desired dimensions. This ring is preferably of lead due to the flexibility and compressibility thereof and its desirable packing characteristics.

The blank, which is preferably of substantially uniform thickness throughout its entire width, but which may be of decreasing thickness at its edge portions, is then bent in any desired manner to bring the edge portions into abutting relationship to provide a flange 3 and a central cavity or open center 4. This may be accomplished by initially bending the blank about an annular core of the desired cross-section and then removing the core and completing the bend.

The flange 3 is adapted to co-operate with a seat in one portion of the closet connection as well understood in the art, and as shown for example in Patent 1,618,188, granted February 22, 1927. The upper rounded portion of the gasket may be directly engaged with the outlet horn of a closet bowl (not shown), whereby it is compressed to provide the desired seal.

Where the edges of the blank are of slightly decreasing thickness, it will be apparent that the flange 3 will taper in cross-section whereby it is adapted to co-operate with a seat of similar cross-section. However, if the blank is of uniform thickness, the abutting edges may be compressed to impart the desired shape thereto.

By a series of experiments I have found that the relative dimensions of the gasket are of considerable importance. If the thickness of the blank or the diameter of the central cavity is increased or decreased an undue amount, there will result a gasket which will be useful under certain degrees of compression but which will be useless when the compression is increased beyond a given point. As irregularities in the parts being connected vary considerably, it is essential that the gasket be capable of acting uniformly throughout its entire range of compression. I have found that these results may be obtained when the diameter of the central cavity is more than two but less than four times the thickness of the material forming its body walls. For example, if the thickness of the blank is approximately one-sixteenth of an inch, the diameter of the central cavity may actually be three-sixteenths of an inch. When the total width of the packing bears a definite relationship to the height of the central portion without the flange 3, the tendency for the packing to compress uniformly will be increased. Thus, if the diameter is three-sixteenths of an inch, the width of the walls will make the total width of the packing substantially equal to five-sixteenths of an inch. This dimension should be substantially equal to the height of the packing excluding the flange portion. This flange in turn may have an average thickness which is substantially equal to its height. Thus, in the example mentioned, the flange may be approximately one-eighth of an inch in height, although this dimension may vary without materially affecting the compression of the packing in case variation to accommodate the packing to a particular packing groove is required.

The advantages of the present invention arise from the provision of a packing which is comparatively inexpensive, which is easily made, and which has a uniform sealing action irrespective of variable degrees of compression to which it is subjected.

I claim:

1. As an article of manufacture a hollow endless gasket having seat engaging portions on opposite faces thereof, one of the seat engaging portions having a flange extending beyond the plane of the body of the gasket and arranged to be seated in a groove in one of the elements to be packed, the flange extending substantially parallel with the axis of the gasket, substantially as described.

2. As an article of manufacture, an annular hollow gasket having seat engaging portions on opposite faces thereof, one of the seat engaging portions having a flange extending beyond the plane of the body of the gasket and arranged to be seated in a groove in one of the elements to be packed, the flange extending substantiially parallel with the axis of the gasket, substantially as described.

3. As a new article of manufacture, an annular hollow gasket formed of a sheet lead annulus, said annulus having an annular space in the body of the gasket while the edges thereof are brought together to form a two ply seat engaging flange extending beyond the plane of the body and within the inner and outer peripheries of the body, the face of the body on the side opposite the flange being also arranged to engage a seat, substantially as described.

4. As a new article of manufacture, a hollow endless gasket formed of a strip of flexible material, said strip having an open space in the body of the gasket while the edge portions of the strip are brought together to form a flange extending from the body and parallel to the axis of the body, said edge portions decreasing in thickness from the body outward to form a tapered seat engaging flange of less diameter than the diameter of the gasket, substantially as described.

5. As a new article of manufacture, an annular hollow gasket formed of a sheet lead annulus, said annulus having an open space in the body of the gasket, while the edge portions of the strip are brought together at one side of the body, to form an annular tapered seat engaging flange extending from one face of the body of the gasket beyond the plane of the body and substantially parallel to the axis of the body, substantially as described.

6. The method of making gaskets comprising forming a strip of flexible material, and bending the same about a core, removing the core and then further bending to bring the edges into overlapping abutting relationship and providing a central open cavity, substantially as described.

In testimony whereof I have hereunto set my hand.

JOHN C. CROMWELL.